(12) United States Patent
Yamashita et al.

(10) Patent No.: US 12,151,440 B2
(45) Date of Patent: Nov. 26, 2024

(54) APPARATUS FOR PRODUCING JOINED-RESIN PRODUCT AND METHOD FOR PRODUCING JOINED-RESIN PRODUCT

(71) Applicant: Toray Industries, Inc., Tokyo (JP)

(72) Inventors: Yusuke Yamashita, Otsu (JP); Shunpei Tonai, Otsu (JP); Kazuya Kanasugi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 1 day.

(21) Appl. No.: 17/801,561

(22) PCT Filed: Jan. 29, 2021

(86) PCT No.: PCT/JP2021/003387
§ 371 (c)(1),
(2) Date: Aug. 23, 2022

(87) PCT Pub. No.: WO2021/176911
PCT Pub. Date: Sep. 10, 2021

(65) Prior Publication Data
US 2023/0131530 A1 Apr. 27, 2023

(30) Foreign Application Priority Data
Mar. 3, 2020 (JP) ................................. 2020-035545

(51) Int. Cl.
*B29C 65/14* (2006.01)
*B29C 65/00* (2006.01)
(52) U.S. Cl.
CPC .......... *B29C 65/1432* (2013.01); *B29C 66/71* (2013.01); *B29K 2995/0039* (2013.01)

(58) Field of Classification Search
CPC ................................ B29C 66/71; B29C 65/14
See application file for complete search history.

(56) References Cited

U.S. PATENT DOCUMENTS 5,421,953 A * 6/1995 Nagakubo ............. B29C 65/004
216/34
10,500,794 B2 12/2019 Takemoto et al.
(Continued)

FOREIGN PATENT DOCUMENTS

| CN | 102196904 A1 | 9/2011 |
| CN | 103561936 A | 2/2014 |

(Continued)

OTHER PUBLICATIONS

International Search Report and Written Opinion for International Application No. PCT/JP2021/003387, dated Apr. 6, 2021, 5 pages.
(Continued)

*Primary Examiner* — Daniel McNally
(74) *Attorney, Agent, or Firm* — Buchanan Ingersoll & Rooney PC

(57) ABSTRACT

Provided is an apparatus for producing a joined-resin product in which two or more resin members are joined. The apparatus includes: a surface treatment mechanism comprising an electrode unit generating ionized gas, and a member holding mechanism arranged at a position separated from the electrode unit by a space and holding the resin member, the surface treatment mechanism activating a surface to be joined of the resin member held by the member holding mechanism, by the ionized gas generated by the electrode unit; and a joining mechanism bonding the two or more resin members together where at least one of surfaces to be joined facing each other is activated by the surface treatment mechanism, at the respective surfaces to be joined.

5 Claims, 11 Drawing Sheets

(56) References Cited

U.S. PATENT DOCUMENTS

| | | |
|---|---|---|
| 2011/0198117 A1 | 8/2011 | Watanabe et al. |
| 2014/0154494 A1 | 6/2014 | Kato et al. |
| 2017/0283657 A1 | 10/2017 | Hähnel |
| 2018/0161554 A1 | 6/2018 | Takemoto et al. |
| 2019/0091905 A1 | 3/2019 | Okashita et al. |

FOREIGN PATENT DOCUMENTS

| | | | |
|---|---|---|---|
| CN | 109890589 A | | 6/2019 |
| EP | 0298869 B1 | | 3/1992 |
| JP | H02110919 A | | 4/1990 |
| JP | H0770335 A | | 3/1995 |
| JP | 2000349051 A | * | 12/2000 |
| JP | 2006295110 A | | 10/2006 |
| JP | 2009027120 A | | 2/2009 |
| JP | 2013132822 A | | 7/2013 |
| JP | 2018065376 A | | 4/2018 |
| TW | 201226510 A | | 7/2012 |
| WO | WO-2016147874 A1 | * | 9/2016 ........ A61M 25/0015 |

OTHER PUBLICATIONS

Chinese Office Action for Chinese Application No. 202180014152. 5, dated Sep. 12, 2023, 7 pages.

Office Action issued Apr. 2, 2024 by the Taiwan Patent Office in corresponding Taiwanese Patent Application No. 110104147. (8 pages).

The Extended European Search Report issued Mar. 13, 2024 by the European Patent Office in corresponding European Patent Application No. 21 765 025.8. (8 pages).

Office Action (Decision of a Patent Grant) issued on Sep. 3, 2024, in corresponding Taiwanese Patent Application No. 110104147. (4 pages).

Office Action (Notice of Reasons for Refusal) issued on Jul. 2, 2024, in corresponding Japanese Patent Application No. 2021-507105 and machine English translation of the Office Action. (6 pages).

\* cited by examiner

APPARATUS FOR PRODUCING JOINED-RESIN PRODUCT AND METHOD FOR PRODUCING JOINED-RESIN PRODUCT

CROSS REFERENCE TO RELATED APPLICATIONS

This application is the U.S. National Phase application of PCT/JP2021/003387, filed Jan. 29, 2021, which claims priority to Japanese Patent Application No. 2020-035545, filed Mar. 3, 2020, the disclosures of these applications being incorporated herein by reference in their entireties for all purposes.

FIELD OF THE INVENTION

The present invention relates to an apparatus and method for producing a joined-resin product having high quality and high joining force.

BACKGROUND OF THE INVENTION

For the purpose of forming further finer semiconductor devices and improving optical properties of optical devices, technologies of joining various components without using adhesives (hereinafter referred to as "adhesive-free bonding") have been studied. Of these technologies, a lamination technology in which resin surfaces to be joined are brought into contact and thereafter heated to the melting temperature of a resin to weld the resin surfaces has been widely used in the adhesive-free joining in which resins to be joined to each other are a target. This method, however, causes a problem in that change (thermal alteration) in a degree of crystal, molecular structure, and the like of the entire resin member occurs during heating and thus optical properties and mechanical strength are adversely affected.

Therefore, as an adhesive-free joining method for resins in order to obtain strong joining force without providing thermal damage, a method of applying surface treatment to the surfaces to be joined of two resin members to be bonded to each other and thereafter bonding those surfaces to be joined together and applying pressure at a low temperature has been being studied.

Patent Literature 1 has disclosed a method for joining resin members to each other by irradiating the surfaces to be joined of the resin members with ultraviolet rays having a wavelength of 10 nm to 200 nm under an atmosphere where an oxygen concentration is lower than that in air, and thereafter pressurizing the resin members while the resin member is heated at a temperature lower than the softening temperature of the resin members.

Patent Literature 2 has disclosed that strong adhesion force is obtained without altering the properties of the resin member by contacting ionized gas to the surfaces to be joined of the resin members and thereafter bonding the resin members together at 70° C. or higher and pressing the bonded resin members while water is interposed on the surfaces to be joined.

PATENT LITERATURE

Patent Literature 1: Japanese Patent Application Laid-open No. 2018-65376
Patent Literature 2: Japanese Patent Application Laid-open No. 2013-132822

SUMMARY OF THE INVENTION

In the method of Patent Literature 1, however, ultraviolet rays penetrate into the inside of the resin member and the layer of the resin modified by the ultraviolet rays becomes deeper, resulting in causing problems of deteriorating optical properties such as yellowing and decrease mechanical strength.

In the method of Patent Literature 2, the surface treatment means is changed from ultraviolet rays to an ionized gas in order to prevent the above problem. This change, however, causes a problem of altering the properties of the resin member due to collisions of charged particles in the ionized gas and heating accompanying with charge accumulation because the resin member is supported by one of the two facing electrodes and the surface to be joined of the resin member is in contact with the ionized gas. This causes an insufficient reduction effect to be obtained with respect to deterioration in optical properties and decrease in mechanical strength of resin members.

The present invention has been made in view of the above-described problems and an object thereof is to provide an apparatus and method for producing an adhesive-free resin joined-product having strong joining force without deteriorating the optical properties or decrease the mechanical strength of resin members.

An apparatus for producing a joined-resin product according to the present invention to solve the above problem is an apparatus for producing a joined-resin product in which two or more resin members are joined. The apparatus includes: a surface treatment mechanism comprising an electrode unit generating ionized gas, and a member holding mechanism arranged at a position separated from the electrode unit by a space and holding the resin member, the surface treatment mechanism activating a surface to be joined of the resin member held by the member holding mechanism, by the ionized gas generated by the electrode unit; and a joining mechanism bonding the two or more resin members together where at least one of surfaces to be joined facing each other is activated by the surface treatment mechanism, at the respective surfaces to be joined.

A method for producing a joined-resin product according to the present invention to solve the above problem is a method for producing a joined-resin product in which two or more resin members are joined. The method includes: a surface treatment step of generating ionized gas and causing the ionized gas to collide against a surface to be joined of the resin member arranged at a position separated by a space from a place where the ionized gas is generated to activate the surface to be joined; and a joining step of bonding together the two or more resin members where at least one of surfaces to be joined facing each other is activated at the surface treatment step, at the respective surfaces to be joined.

According to the present invention, an apparatus for producing a jointed-resin product and a method for producing the joined-resin product having high quality and high joining force are provided.

DETAILED DESCRIPTION OF EMBODIMENTS OF THE INVENTION

[First Embodiment of Apparatus for Producing Joined-Resin Product]

Figure 1:
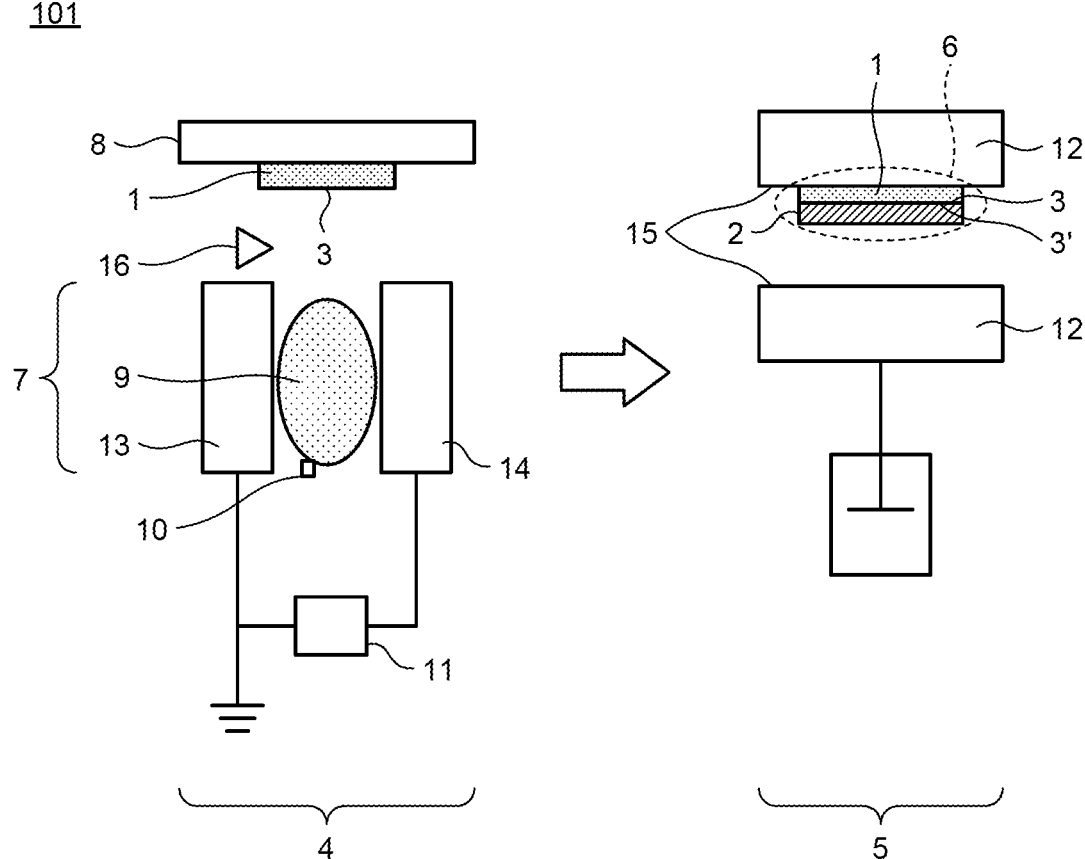
FIG. 1 is a schematic view illustrating an example of an apparatus for producing a joined-resin product according to the present invention.

Hereinafter, examples of the embodiments of the invention will be described with reference to the drawings. FIG. 1 is a schematic view illustrating an example of the apparatus for producing the joined-resin product according to the present invention. As illustrated in FIG. 1, a production apparatus 101 of the first embodiment includes a surface treatment mechanism 4 that activates a surface 3 to be joined of a first resin member 1 to a second resin member 2 and/or a surface 3' to be joined of the second resin member 2 to the first resin member 1 and a joining mechanism 5 that bonds the first resin member 1 and the second resin member 2 together at respective surfaces 3 and 3' to be joined after the surface treatment performed by the surface treatment mechanism 4.

As the first resin member 1 and the second resin member 2, polyimide (PI), a silicone resin (SI), an epoxy resin (EP), a phenol resin (PF), a polyurethane resin (PU), a melamine resin (MF), polyethylene (PE), polyamide (PA), polyacetal (POM), polybutylene terephthalate (PBT), polyphenylene sulfide (PPS), polyetheretherketone (PEEK), polytetrafluoroethylene (PTFE), and the like may be arbitrarily selected depending on applications.

Thermoplastic resins such as polypropylene (PP) and polyethylene terephthalate (PET) are preferably used as compared with thermoset resins such as polyimide and the epoxy resin. In particular, amorphous thermoplastic resins such as polyvinyl chloride (PVC), polystyrene (PS), acrylonitrile butadiene styrene (ABS), polymethyl methacrylate (PMMA), polycarbonate (PC), polyetherimide (PEI), and polyamideimide (PAI) are preferably used. This is because thermoplastic and non-crystalline materials have higher thermal mobility of the molecular chains and thus molecular diffusion at the joined interface of the first resin member 1 and second resin member 2 is larger. As the molecular diffusion becomes larger, the intermolecular force at the joined interface becomes larger and thus the joining force is improved. The kinds of the first resin member 1 and the second resin member 2 may be different but the same kind is preferable from the viewpoint of the molecular diffusion.

Hereinafter, the respective surface treatment mechanism 4 and joining mechanism 5 will be described.

[Surface Treatment Mechanism]

First, the surface treatment mechanism 4 will be described. The surface treatment mechanism 4 has an electrode unit 7 and a member holding mechanism 8 that holds the first resin member 1. The member holding mechanism 8 illustrated in FIG. 1 holds the first resin member 1 and may hold the second resin member 2 instead of the first resin member 1 or may simultaneously hold the first resin member 1 and the second resin member 2. After the surface treatment of the first resin member 1, the second resin member 2 may be held by the member holding mechanism 8.

The electrode unit 7 is composed of an anode 13, a cathode 14 arranged by providing a space between the anode 13, and at least one or more gas supply nozzles 16.

The anode 13 and the cathode 14 are connected to a power source for generating ionized gas 11. After supplying any gas for generating ionized gas from the gas supply nozzle 16, the ionized gas 9 is generated by applying voltage equal to or higher than breakdown voltage (electric field) between the anode 13 and the cathode 14 using this power source for generating ionized gas 11.

The gas supply nozzle 16 is preferably electrically insulated from the cathode 14. The electrical insulation prevents high voltage of the cathode 14 from being applied to the gas supply nozzle 16 and thus can reduce abnormal discharge that may occur at the gas supply port or the like of the gas supply nozzle 16. Reducing this abnormal discharge allows gas to be stably supplied and the surface 3 to be joined of the first resin member 1 and/or the surface 3' to be joined of the second resin member 2 to be continuously activated. The gas supply port of the gas supply nozzle 16 may be a slit-like shape in a depth direction and a plurality of supply ports may be provided.

In the present invention, the term "ionized gas 9" refers to a gas including charged particles such as ions and electrons, active species such as radicals and excitons, and neutrons. The term "radical" refers to an atom or molecule having highly reactive unpaired electrons.

The species of the gas for generating ionized gas is not particularly limited. Examples of the gas species include noble gas such as argon and helium and non-polymerizable gas such as oxygen, water vapor, and nitrogen. Two or more different gas species may be mixed.

In the surface treatment mechanism 4, the charged particles in the ionized gas 9 generated between the anode 13 and the cathode 14 do not diffuse and the active species and neutrons mainly diffuse outside the electrode unit 7. The active species among the diffused gas adhere to the surface 3 to be joined of the first resin member 1, which is separately arranged from the electrode unit 7 by a space and thus the surface 3 to be joined chemically reacts to activate the surface 3 to be joined.

The surface treatment may be applied to only either of the surface 3 to be joined of the first resin member 1 or the surface 3' to be joined of the second resin member 2 or the surface treatment may be applied to both of the surface 3 to be joined and the surface 3' to be joined using the surface treatment mechanism 4. In the following description of the surface treatment mechanism 4, the case where the surface treatment is applied to the surface 3 to be joined of the first resin member 1 will be described, unless otherwise described. In the case where the surface treatment is applied to the surface 3' to be joined of the second resin member 2, the resin member 1 may be read as the resin member 2 and the surface 3 to be joined may be read as the surface 3' to be joined.

The term "activation" in the present invention means that the active species is chemically reacted with the surface 3 to be joined to cleave the molecular chains existing at the surface layer of the surface 3 to be joined and/or to impart functional groups. Cleaving the molecular chains allows the thermal mobility of the molecular chains existing at the surface 3 to be joined to increase (softening temperature to be lowered). Imparting the functional groups allows polar functional groups such as hydroxy groups to be generated. The thermal mobility of these molecular chains can be measured by a nanothermal microscope (nano-TA) or other means. The kinds and generated amounts of the polar functional groups can be determined by infrared absorption spectroscopy (IR) and other means.

The degree of activity of the surface 3 to be joined can be easily controlled by changing the used gas species, the gas flow rate, the output of the power source for generating ionized gas 11, or the like.

As the power source 11 for generating ionized gas, a direct-current power source or an alternating-current power source can be selected. In the present invention, the term "alternating-current" refers to current that constantly varies the magnitude of a voltage value and current value with time. A common example of the alternating-current is alternating-current of which values vary sinusoidally with time. Other examples include alternating-current of which values vary in the form of a square wave or pulse wave. A power source frequency in the alternating-current power sources is not particularly specified. Examples of the power source frequency include low frequencies on the order of several kHz, high frequencies on the order of several tens of MHz, and microwaves on the order of several GHz.

The materials of the anode 13 and the cathode 14 in the electrode unit 7 are preferably selected from electrode materials having a low sputtering rate such as stainless steel and titanium. These materials allow the sputtering of the electrode material to be reduced and the adhesion of impurities to the surface 3 to be joined to be prevented. In order to reduce a current inflow amount to the power source for generating ionized gas 11, the surfaces of the anode 13 and the cathode 14 may be coated with a dielectric material such as alumina.

The surface treatment mechanism 4 is preferably provided with a step monitoring means 10 for monitoring the step. Providing this step monitoring means 10 allows abnormalities during the surface treatment to be detected at an early stage. For example, providing an emission spectrometer that can measure the emission state of the ionized gas 9 allows the kind and degree of ionization of the gas in the ionized gas 9 to be determined from the emission peak and emission wavelength of the gas. In addition, arranging a radical monitor allows the amount of radicals to be measured. Moreover, inserting various probes such as curling probes allows the density of ionized gas 9 to be measured. These monitoring means may be any means other than those means described here and may be appropriately changed depending on the target to be monitored.

The member holding mechanism 8 holds the first resin member 1 so that the space where the ionized gas 9 is generated between the anode 13 and the cathode 14 and the surface 3 to be joined of the first resin member 1 separately face each other by a space. The specific mechanism and installation location of the member holding mechanism 8 are not particularly limited as long as the first resin member 1 can be held as described above. The member holding mechanism 8 may hold both of the first resin member 1 and the second resin member 2 or may hold only either of them. Two or more member holding mechanisms 8 may be provided. In the surface treatment mechanism 4 according to the first embodiment, charged particle collisions and heat load to the surface 3 to be joined can be reduced and deterioration in optical properties and decrease in mechanical strength of the first resin member 1 can be reduced because the first resin member 1 is held not on the electrode but by the member holding mechanism 8 separately located from the electrode unit 7 by a space. The same will be applied in the case where the surface 3' to be joined of the second resin member 2 is activated.

[Joining Mechanisms]

Subsequently, the joining mechanism 5 will be described. The joining mechanism 5 is a means of bonding the surface 3 to be joined of the first resin member 1 and the surface 3' to be joined of the second resin member 2 together and examples of the joining mechanism 5 include heating and pressurizing means such as a heat press machine 12.

Bonding the surface 3 to be joined of the first resin member 1 and the surface 3' to be joined of the second resin member 2 together using the joining mechanism 5 allows entanglement of the molecular chains at their interface (hereinafter referred to as molecular diffusion) and a condensation reaction between polar functional groups (hereinafter referred to as covalent bond formation) to proceed and thus the joining force to be developed between the surface 3 to be joined of the first resin member 1 and the surface 3' to be joined of the second resin member 2. This allows the joined-resin product 6 having strong joining force to be produced. In the surface treatment mechanism 4, at least one surface among three or more surfaces of the resin members to be joined may be activated and the resin members may be overlapped and bonded together.

The joining mechanism 5 is preferably equipped with a heating means. Heating the first resin member 1 and the second resin member 2 allows the molecular diffusion and the covalent bond formation to be promoted and thus the joining force of the joined-resin product 6 to be further improved. Although not particularly limited, infrared heaters, microwave heaters, ultrasonic heaters, hot air generators, furnaces, and the like can be used as the heating means.

The joining mechanism 5 is preferably equipped with a pressurizing means. Bonding the surface 3 to be joined of the first resin member 1 and the surface 3' to be joined of the second resin member 2 together and thereafter pressurizing the bonded resin members allow voids between the surface 3 to be joined of the first resin member 1 and the surface 3' to be joined of the second resin member due to waviness or other factors to be eliminated. This allows the actual contact area of the surface 3 to be joined and the surface 3' to be joined to increase and the joining force of the joined-resin product 6 to be improved.

In the case where the joining mechanism 5 is a heat press machine 12, a press surface 15 is preferably a soft rubber material such as silicone rubber or urethane rubber. This allows a cushioning property to be improved and pressure to be uniformly applied to the press surfaces 15. This allows the actual contact area of the surface 3 to be joined of the first resin member 1 and the surface 3' to be joined of the second resin member to increase and the joining force of the joined-resin product 6 to be further improved. A cushioning material made of a rubber material, which is not illustrated, may be placed between the first resin member 1 and/or the second resin member 2 and the press surface 15.

The joining mechanism 5 is preferably equipped with a post-heating mechanism, which is not illustrated. Performing post-heating to the joined-resin product 6 using the post-heating means after the joined-resin product 6 is joined allows the molecular diffusion at the joining interface to be promoted and the joining force of the joined-resin product 6 to be further improved. Although not particularly limited, infrared heaters, microwave heaters, ultrasonic heaters, hot air generators, furnaces, and the like can be used as the post-heating means.

[Second Embodiment of Apparatus for Producing Joined-Resin Product]

Figure 2:
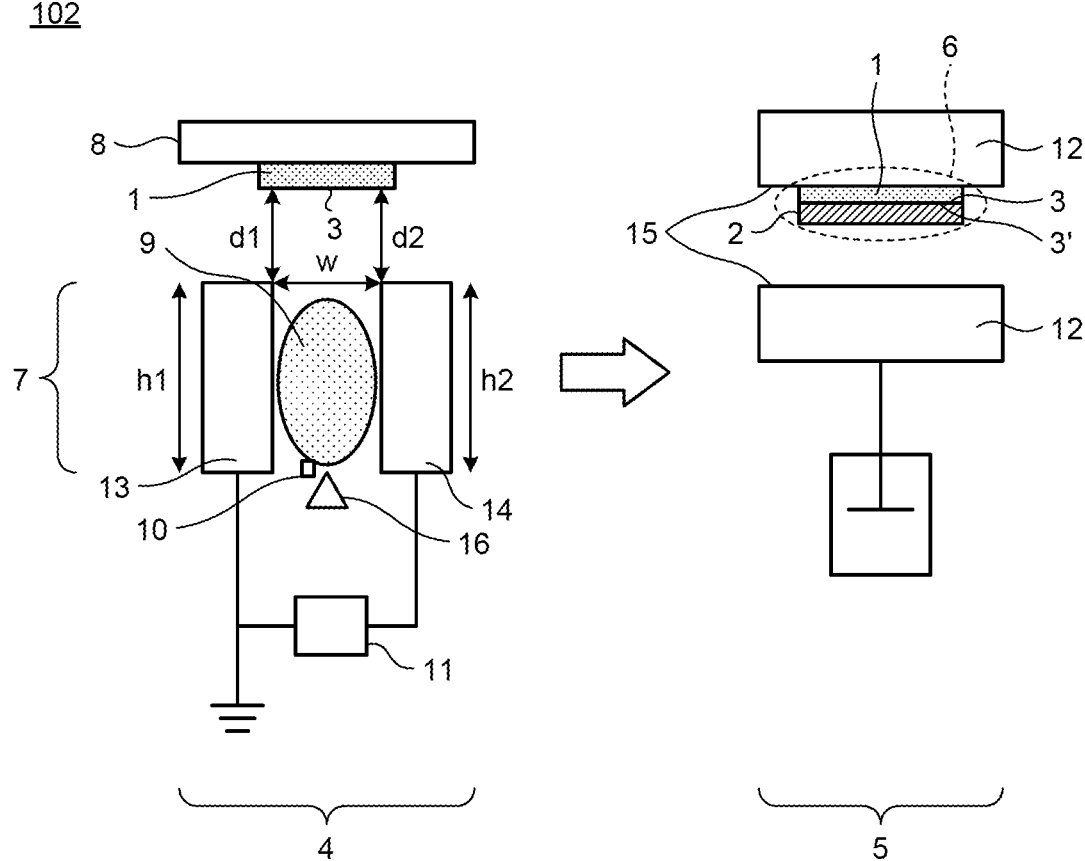
FIG. 2 is a schematic view illustrating another example of the apparatus for producing the joined-resin product according to the present invention.

FIG. 2 is a schematic view illustrating the second embodiment of the apparatus for producing the joined-resin product according to the present invention. The difference between the production apparatus 101 of the first embodiment described above and this production apparatus 102 of the second embodiment is the electrode unit 7 of the surface treatment mechanism 4.

As illustrated in FIG. 2, in the production apparatus 102 of the second embodiment, the gas supply nozzle 16 of the electrode unit 7 is arranged so that the gas supply nozzle 16 can supply gas for generating ionized gas toward the surface 3 to be joined of the first resin member 1 held by the member holding mechanism 8 through a space generating the ionized gas 9 between the anode 13 and the cathode 14. As described above, passing the gas for generating ionized gas through the space between the anode 13 and the cathode 14 allows the gas decomposition efficiency by the ionized gas 9 to increase. This allows the active species required for activating the surface 3 to be joined to be generated in a large amount and thus high-speed processing to be possible. Arranging the gas supply nozzle 16 so as to supply the gas for generating ionized gas toward the member holding mechanism 8 allows the active species in the ionized gas 9 to be efficiently transported to the surface 3 to be joined of the first resin member 1 by gas flow and thus the surface 3 to be joined to be activated at high speed.

The shape of anode 13 and the cathode 14 is preferably a plate-like shape. Both length h1 of the anode 13 in the gas supply direction and length h2 of the cathode 6 in the gas supply direction are preferably set longer than the distance w between the anode 13 and the cathode 14. Setting the lengths h1 and h2 longer than the distance w to spread the ionized gas 9 in the gas supply direction allows the distance where the gas for generating ionized gas passes through the ionized gas 9 to be longer and gas decomposition by the ionized gas 9 to be promoted. This allows the active species to be generated in a large amount and the activation speed to the surface 3 to be joined to be increased.

The length h1 of the anode 13 in the gas supply direction and the length h2 of the cathode 14 in the gas supply direction do not necessarily have to be the same length. The lengths, however, are preferably the same. For example, in the case where h1 is shorter than h2 and the positions of the anode 13 and the cathode 14 in the gas supply nozzle 16 side are aligned, the gap between the anode 13 and the first resin member 1 is wider than the gap between the cathode 14 and the first resin member 1 and thus there is a risk that the gas for generating ionized gas passing through the ionized gas 9 along the anode 13 and the cathode 14 may diffuse from this gap into the apparatus. When h1 and h2 are the same length, the gas for generating ionized gas can efficiently pass through the ionized gas 9 without diffusing the gas for generating ionized gas into the apparatus.

The anode 13 and the cathode 14 do not necessarily have to be parallel. However, the anode 13 and the cathode 14 are preferably arranged in an approximately parallel arrangement. When the anode 13 and the cathode 14 are arranged in an approximately parallel arrangement, a uniform electric field can be formed between the anode 13 and the cathode 14 and thus the surface 3 to be joined can be stably activated without inducing abnormal discharge due to local electric field concentration. The term "approximately parallel" means that the anode 13 and the cathode 14 are designed so as to be parallel. Even when the anode 13 and the cathode 14 deviate slightly from parallel due to production errors, this arrangement is included in the "approximately parallel" arrangement. On the other hand, when the anode 13 and the cathode 14 are designed so as not to be parallel, this arrangement is not included in the "approximately parallel" arrangement.

A distance d1 between the surface 3 to be joined of the first resin member 1 and the anode 13 and a distance d2 between the surface 3 to be joined of the first resin member 1 and the cathode 14 are preferably about the same. Considering the charged particle collisions and heat load from the ionized gas 9, the distance d1 and the distance d2 may be appropriately adjusted while the distance d1 and the distance d2 are set to about the same.

[Third Embodiment of Apparatus for Producing Joined-Resin Product]

Figure 3:
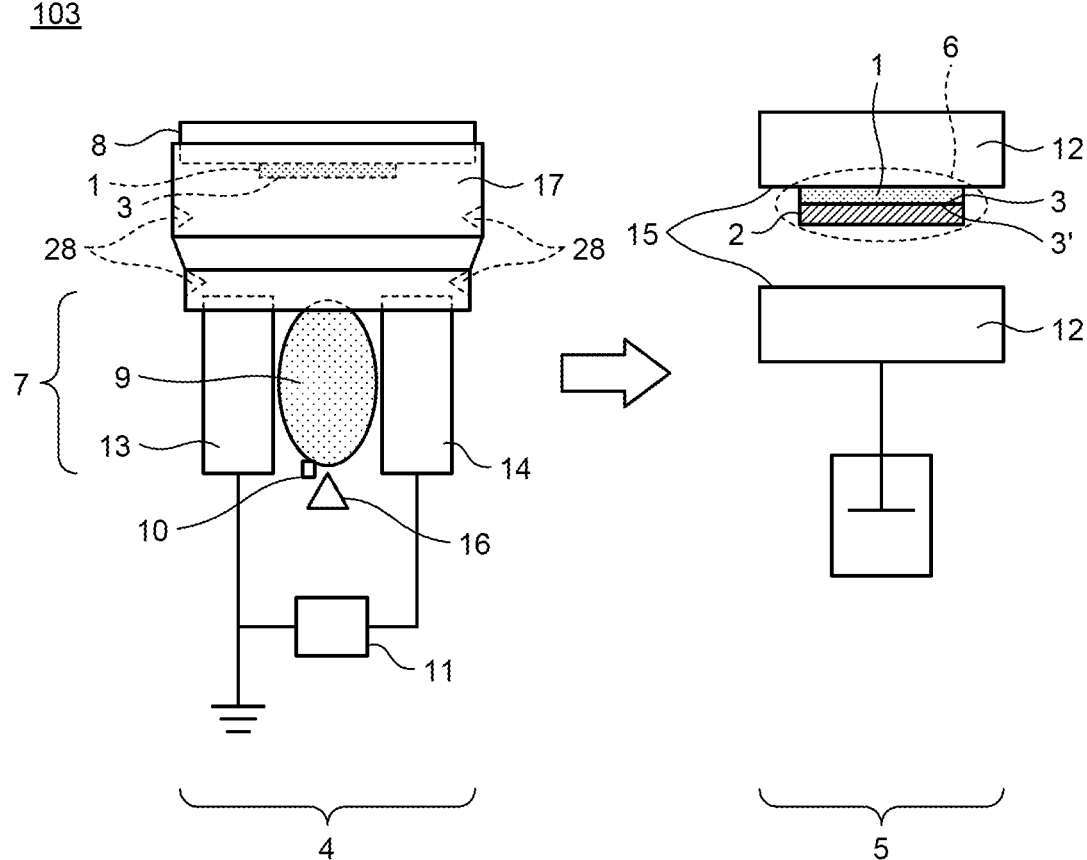
FIG. 3 is a schematic view illustrating another example of the apparatus for producing the joined-resin product according to the present invention.

FIG. 3 is a schematic view illustrating the third embodiment of the apparatus for producing the joined-resin product according to the present invention. The difference between the production apparatus 102 of the second embodiment described above and this production apparatus 103 of the third embodiment is that the surface treatment mechanism 4 is equipped with a rectification plate.

As illustrated in FIG. 3, the surface treatment mechanism 4 is equipped with a rectification plate 17 so as to surround a space between the member holding mechanism 8 and the electrode unit 7. Providing a rectification plate 17 so as to surround the space between the member holding mechanism 8 and the electrode unit 7 allows the active species to be efficiently supplied to the surface 3 to be joined of the first resin member 1 and the activation speed to the surface 3 to be joined to be increased. This allows the joining force of the joined-resin product 6 to further increase. In addition, the inflow of impurities (air, moisture, and the like) other than the gas for generating ionized gas is reduced, and thus the unintended formation of the functional groups at the surface 3 to be joined can be reduced and the degree of activity can increase. This allows the joining force of the joined-resin product 6 to further increase.

The rectification plate 17 may also be equipped with a second gas supply nozzle 28. Arranging the gas supply nozzles 28 on the rectification plate 17 and supplying gas from the wall surface allows the active species not to be directed to the wall surface of the rectification plate 17 and the number of the active species that adhere to the wall surface without being supplied to the surface 3 to be joined to be reduced. This allows a large amount of the active species to be supplied to the surface 3 to be joined.

The rectifier plate is preferably electrically insulated from the anode 13 and the cathode 14 so as to have electrically floating potential. This allows the attraction of charged particles due to the electric field to be reduced and the charged particle collisions to the surface 3 to be joined to be reduced.

The rectification plate 17 does not necessarily have to surround the entire space between the member holding mechanism 8 and the electrode unit 7 and may surround only the space between the first resin member 1 and the electrode unit 7.

[Fourth Embodiment of Apparatus for Producing Joined-Resin Product]

Figure 4:
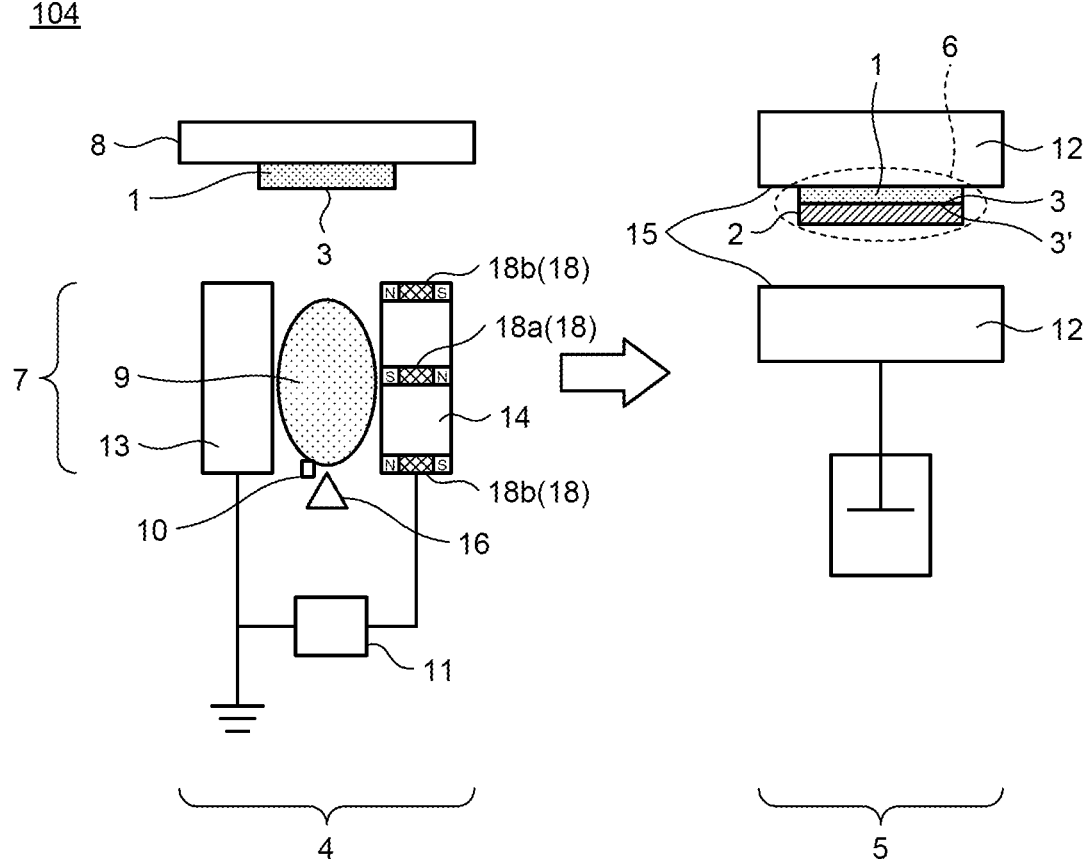
FIG. 4 is a schematic view illustrating another example of the apparatus for producing the joined-resin product according to the present invention.

FIG. 4 is a schematic view illustrating the fourth embodiment of the apparatus for producing the joined-resin product according to the present invention. The difference between the production apparatus 102 of the second embodiment described above and this production apparatus 104 of the fourth embodiment is the electrode unit 7 of the surface treatment mechanism 4.

As illustrated in FIG. 4, the electrode unit 7 is equipped with magnets 18 inside the cathode 14, which form a magnetron magnetic field in the space between the cathode 14 and the anode 13.

The magnets 18 may be electromagnets or may be permanent magnets such as ferrite magnets or neodymium magnets.

The magnets 18 provided inside the cathode 14 are permanent magnets and are arranged so that a central magnet 18a is surrounded by peripheral magnets 18b. As the polarity of those magnets 18, the central magnet 18a and the peripheral magnets 18b have opposite polarity.

In FIG. 4, the surface polarity of the central magnet 18a in the cathode 14 viewed from the anode 13 side is determined to be S-pole and the surface polarity of the peripheral magnets 18b is determined to be N-pole. These polarities may be arranged so as to be reversed. Arranging the magnets 18 as described above allows a magnetron magnetic field to be formed in the space between the cathode 14 and the anode 13. The magnetron magnetic field allows the charged particles in the ionized gas 9 to be localized and thus the diffusion and collisions of the charged particles to the surface 3 to be joined of the first resin member 1 to be reduced, resulting in further reducing the deterioration in the optical properties and decrease in the mechanical strength of the first resin member 1. Localization of the charged particles caused by the magnetron magnetic field allows the efficiency of decomposition of the gas for generating ionized gas to be improved and the density of the ionized gas 9 to increase. This allows the discharge impedance between the cathode 14 and the anode 13 to be lowered and the discharge voltage applied to the cathode 14 to be lowered. This decrease in the discharge voltage allows the energy of ions and sputter particles that are bounced back at the surface of the cathode 14 to be lowered because the discharge voltage applied to the cathode 14 becomes lower and thus the damage when these ions and sputter particles collide against the surface 3 to be joined can be reduced.

In addition, with improvement in decomposition efficiency of the gas for generating ionized gas, a large amount of the active species can be generated. This allows the surface 3 to be joined to be activated at high speed.

A cooling water channel, which is not illustrated, is preferably formed between each of the 18 magnets. Any cooling means other than water can be used. Cooling the magnets 18 allows demagnetization of the magnet 18 due to heat to be reduced.

The magnetron magnetic field formed by the central magnet 18a and the peripheral magnets 18b can be measured at the surface of the cathode 14 by a magnetic flux density measuring device such as a gauss meter. As the magnetic flux density becomes higher, the density of the ionized gas 9 can increase more.

[Fifth Embodiment of Apparatus for Producing Joined-Resin Product]

Figure 5:
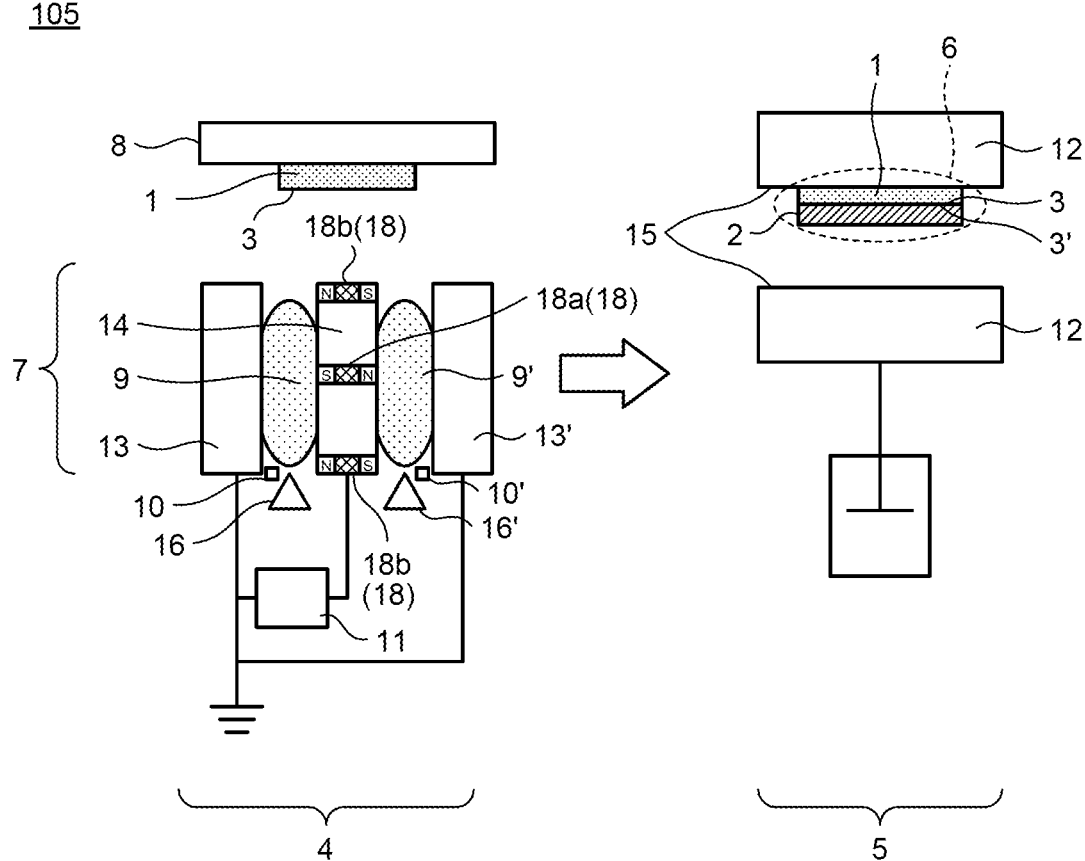
FIG. 5 is a schematic view illustrating another example of the apparatus for producing the joined-resin product according to the present invention.

FIG. 5 is a schematic view illustrating the fifth embodiment of the apparatus for producing the joined-resin product according to the present invention. The difference between the production apparatus 104 of the fourth embodiment described above and this production apparatus 105 of the fifth embodiment exists in the electrode unit 7 of the surface treatment mechanism 4.

As illustrated in FIG. 5, two anodes 13 and 13' are arranged separately by a space so as to interpose the cathode 14 to generate ionized gases 9 and 9' on both sides of the cathode 14. As described above, generating ionized gases 9 and 9' on both sides of cathode 14 allows the magnetron magnetic field to be effectively utilized and a large amount of the active species to be generated by the densified ionized gas. This allows the surface 3 to be joined to be activated in further higher speed.

[Sixth Embodiment of Apparatus for Producing Joined-Resin Product]

Figure 6:
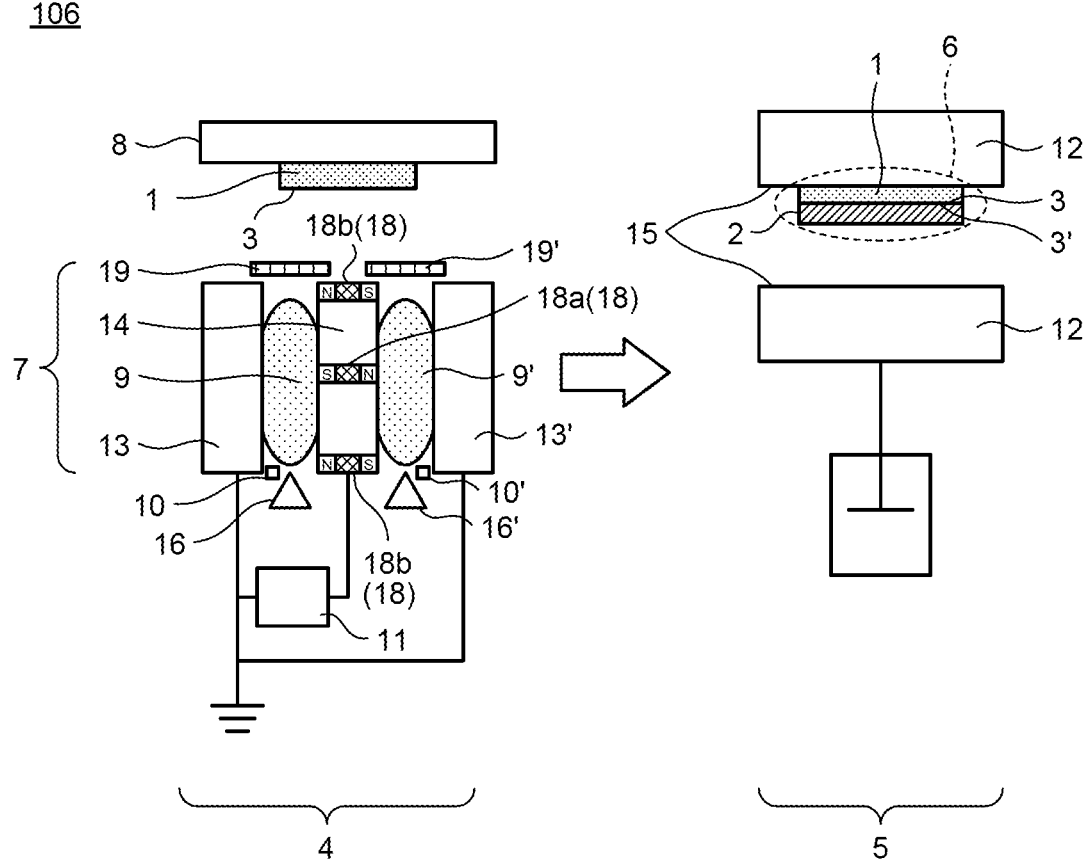
FIG. 6 is a schematic view illustrating another example of the apparatus for producing the joined-resin product according to the present invention.

FIG. 6 is a schematic view illustrating the sixth embodiment of the apparatus for producing the joined-resin product according to the present invention. The difference between the production apparatus 105 of the fifth embodiment described above and this production apparatus 106 of the sixth embodiment is that the surface treatment mechanism 4 is equipped with a metal mesh.

As illustrated in FIG. 6, in the surface treatment mechanism 4, the grounded metal meshes 19 and 19' are arranged in a space between the space between the cathode 14 and the anodes 13 and 13' and the first resin member 1 and/or the second resin member 2. Arranging the grounded metal meshes 19 and 19' allows the charged particles leaking from the electrode unit 7 to be sucked by an electric field. This allows the charged particle collisions to the surface 3 to be joined of the first resin member 1 to be reduced and decrease in mechanical strength and deterioration in optical properties to be reduced. Arranging the metal meshes 19 and 19' also allows the sputtered electrode material to be captured to reduce adhesion of foreign matter to the surface 3 to be joined.

In the embodiment illustrated in FIG. 6, two spaces exist between the anode 13 and the cathode 14 and between the anode 13' and the cathode 14 and the metal meshes 19 and 19' are arranged between both of the spaces and the first resin member 1 and/or the second resin member 2. Arranging even only either one of the metal meshes, however, allows the effect of reducing the leakage of the charged particles to be obtained to some extent. Arranging both of the metal meshes allows the leakage of the charged particles to be sufficiently reduced, which is preferable. In the embodiment illustrated in FIG. 6, the metal meshes 19 and 19' are arranged between the anode 13 and the cathode 14 and between the anode 13' and the cathode 14, respectively. However, a configuration in which a single metal mesh shields each space may be employed.

Although not particularly limited, the metal meshes 19 and 19' made of a meshed product formed by weaving metal wires together or made of a perforated metal sheet formed by piercing holes in a metal sheet may be used.

[Seventh Embodiment of Apparatus for Producing Joined-Resin Product]

Figure 7:
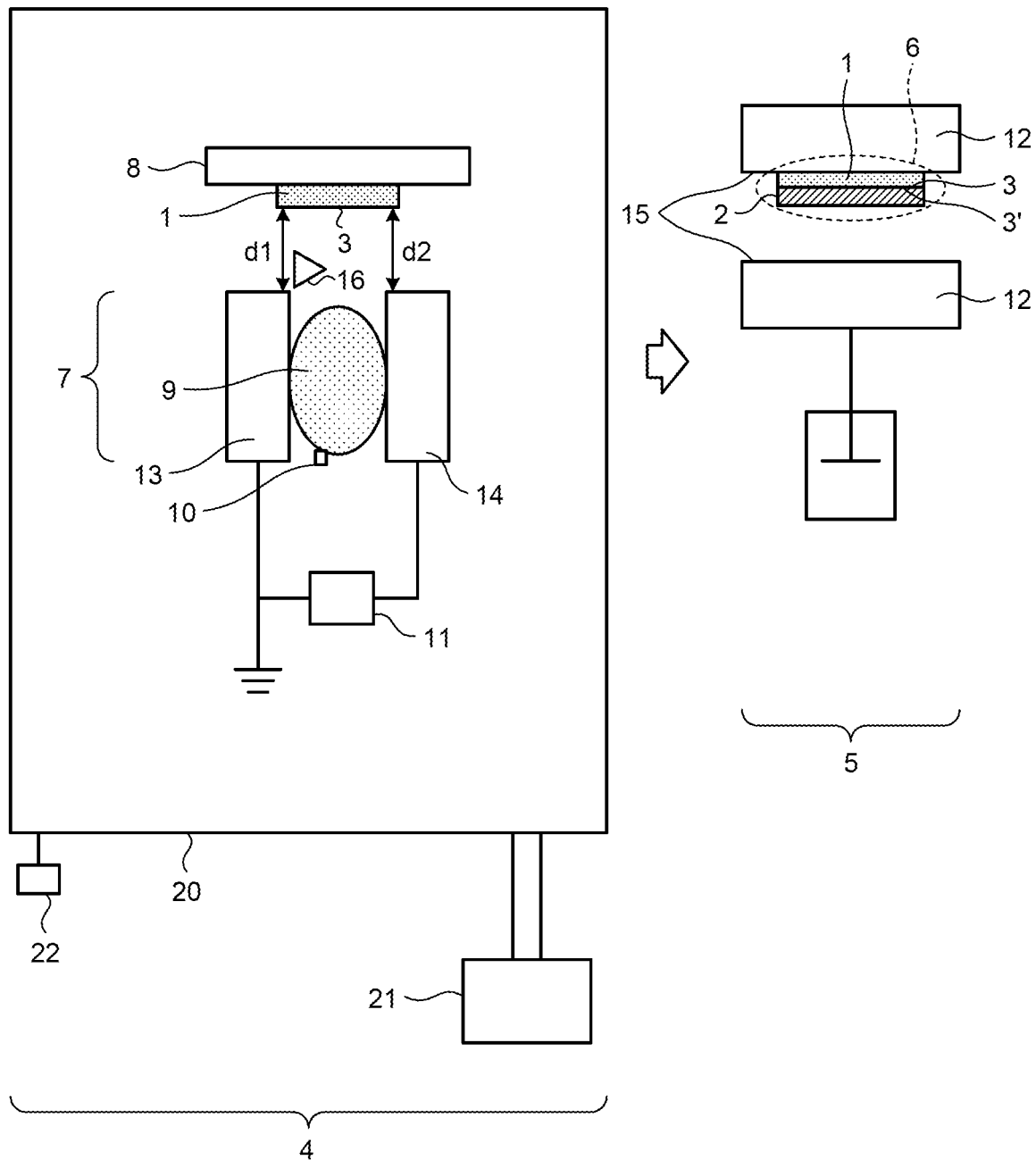
FIG. 7 is a schematic view illustrating another example of the apparatus for producing the joined-resin product according to the present invention.

FIG. 7 is a schematic view illustrating the seventh embodiment of the apparatus for producing the joined-resin product according to the present invention. The difference between the production apparatus 101 of the first embodiment described above and this production apparatus 107 of the seventh embodiment is that the surface treatment mechanism 4 is arranged in a chamber 20 and the inside of the chamber 20 is vacuum-evacuated by a vacuum pump 21.

Setting the surface treatment environment to vacuum allows a distance (mean free path) until the active species in the ionized gas 9 collide against other active species or neutrons to increase. This allows the amount of recombination loss of the active species before reaching the surface 3 to be joined of the first resin member 1 to be reduced and the surface 3 to be joined to be activated at high speed. The surface 3 to be joined of the first resin member 1 can be activated by even widening the distances d1 and d2 between the electrode unit 7 and the surface 3 to be joined of the first resin member 1 and thus the heat load from the ionized gas 9 can be further reduced by widening the distances d1 and d2. This allows decrease in the mechanical strength and deterioration in optical properties to be reduced.

The term "vacuum" in the present invention means a gas pressure lower than atmospheric pressure. The degree of vacuum in the chamber 20 can be monitored with a vacuum gauge 22 such as a differential pressure gauge, a Pirani vacuum gauge, and an ionization vacuum gauge.

[Eighth Embodiment of Apparatus for Producing Joined-Resin Product]

Figure 8:
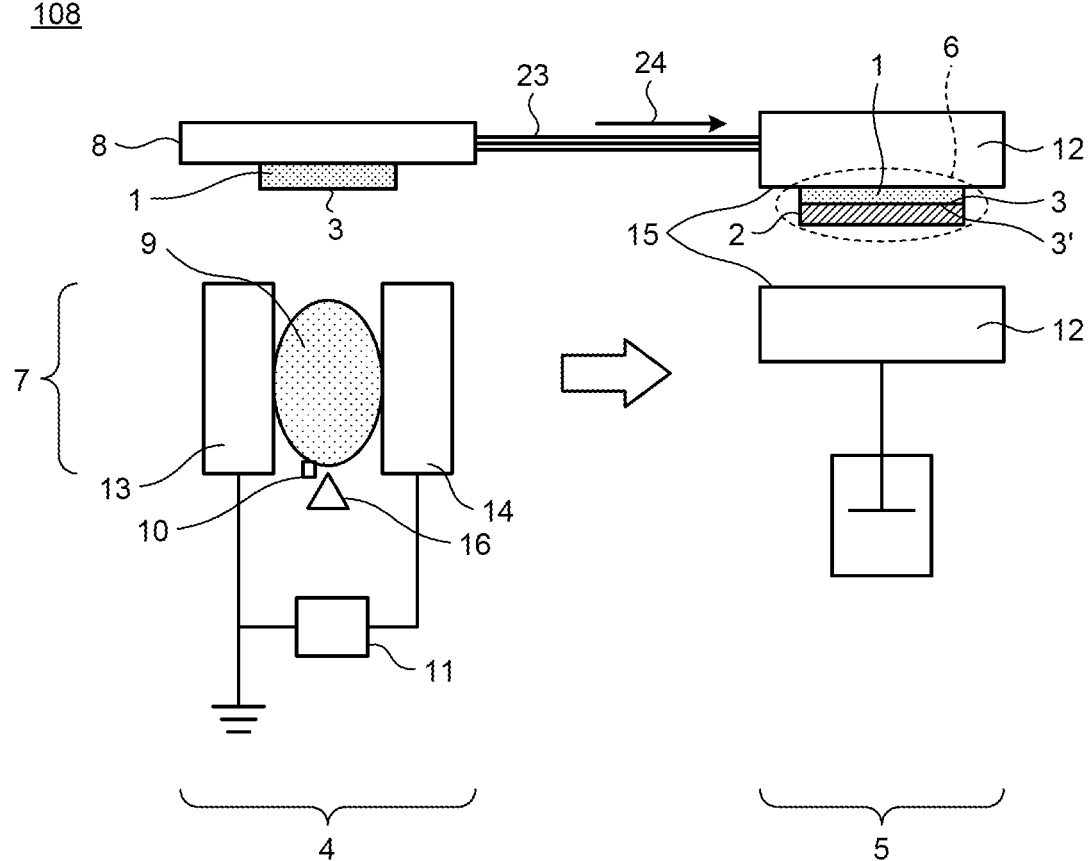
FIG. 8 is a schematic view illustrating another example of the apparatus for producing the joined-resin product according to the present invention.

FIG. 8 is a schematic view illustrating the eighth embodiment of the apparatus for producing the joined-resin product according to the present invention. This production apparatus 108 of the eighth embodiment is equipped with a resin member conveying mechanism 23 for automatically conveying the first resin member 1 and/or the second resin member 2 to the joining mechanism 5. The resin member conveying mechanism 23 is not particularly limited. Example of the resin member conveying mechanism 23 include a belt conveyor that conveys the first resin member 1 and/or the second resin member 2 by rotating a ring-shaped belt on a cart and a conveying robot that runs by itself between steps to convey the first resin member 1 and/or the second resin member 2 in the direction of the conveying direction 24.

[Ninth Embodiment of Apparatus for Producing Joined-Resin Product]

Figure 9:
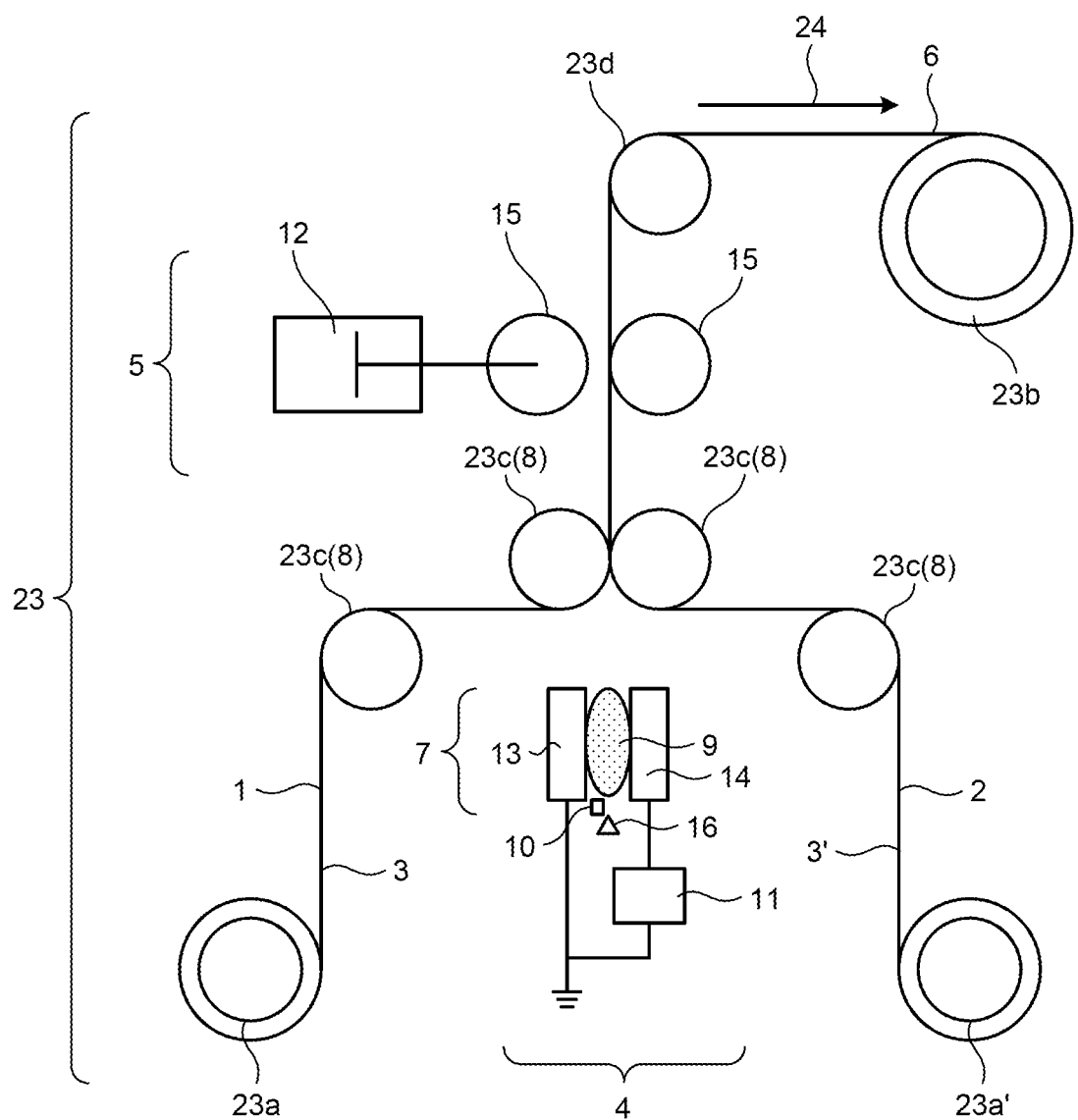
FIG. 9 is a schematic view illustrating another example of the apparatus for producing the joined-resin product according to the present invention.

FIG. 9 is a schematic view illustrating the ninth embodiment of the apparatus for producing the joined-resin product according to the present invention. This production apparatus 109 of the ninth embodiment is equipped with a resin member conveying mechanism 23 composed of unwinding rolls 23a and 23a', a winding roll 23b, and conveying rolls 23c and 23d conveying the first resin member 1 and/or the second resin member 2 to the joining mechanism 5. The first resin member 1 is unwound by the unwinding roll 23a, the second resin member 2 is unwound by the unwinding roll 23a', the first resin member 1 and the second resin member 2 are conveyed by the conveying rolls 23c, the joined-resin product 6 is conveyed by the conveying roll 23d, and the joined-resin product 6 is wound by the winding roll 23b. With respect to the first resin member 1 and/or the second resin member 2 during conveyance, the surface 3 to be joined of the first resin member 1 and/or the surface 3' to be joined of the second resin member 2 held by the resin member holding mechanism 8 composed of four conveying rolls 23c is subjected to the surface treatment using the electrode unit 7 and the surface 3 to be joined of the first resin member 1 and the surface 3' to be joined of the second resin member 2 are bonded together by the joining mechanism 5, whereby the joined-resin product 6 can be continuously produced in the case where the first resin member 1 and the second resin member 2 are thin long members. This allows the productivity of joined-resin product 6 to increase as compared to batch processing. Intermittent conveyance may also be used depending on the processing time in each step.

[Tenth Embodiment of Apparatus for Producing Joined-Resin Product]

Figure 10:
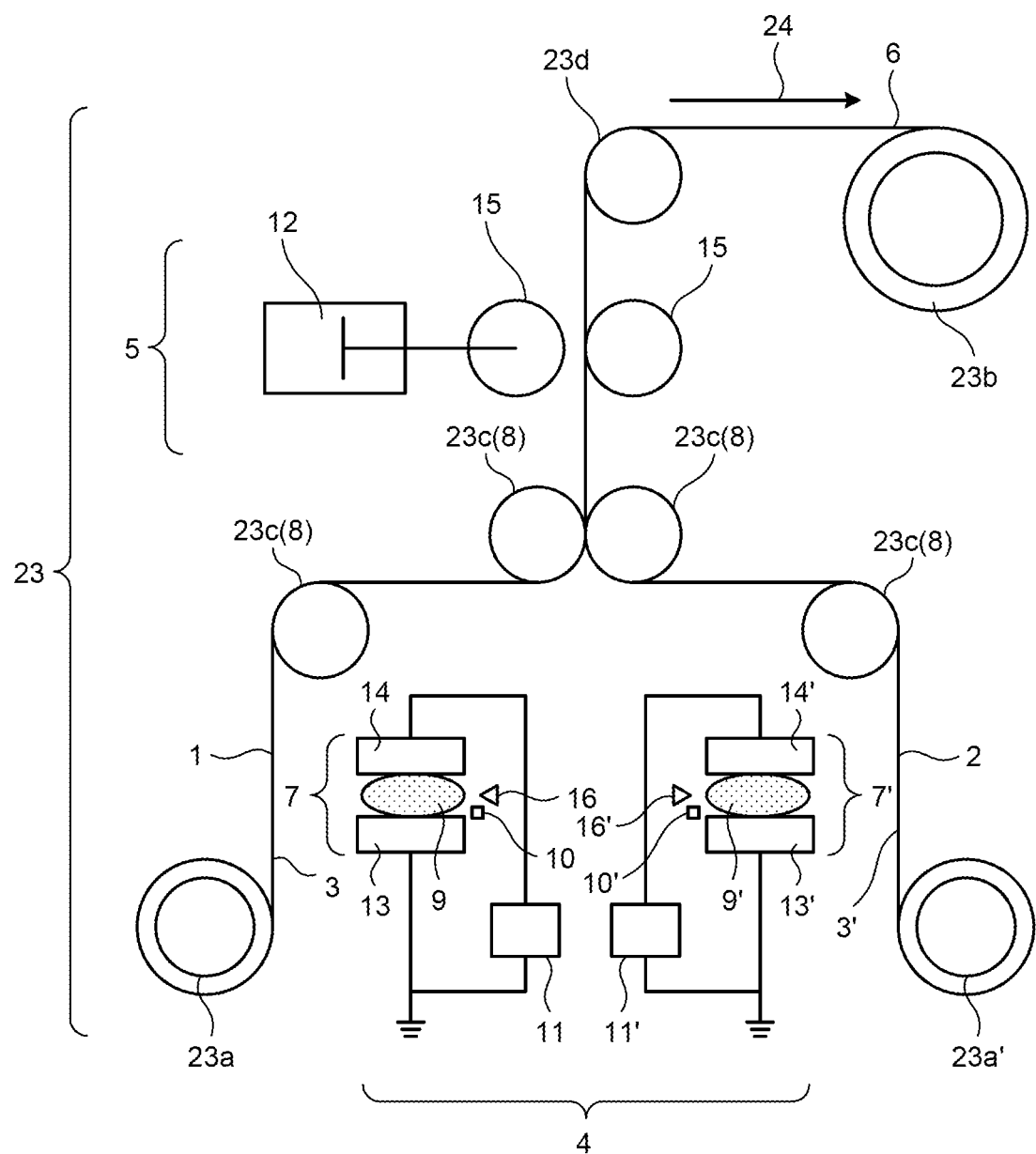
FIG. 10 is a schematic view illustrating another example of the apparatus for producing the joined-resin product according to the present invention.

FIG. 10 is a schematic view illustrating the tenth embodiment of the apparatus for producing the joined-resin product according to the present invention. This production apparatus 110 of the tenth embodiment is equipped with the electrode units 7 and 7' and power sources for generating ionized gas 11 and 11' that separately treat the surfaces of the first resin member 1 and the second resin member 2 during conveyance. As described above, with respect to the respective first resin member 1 and second resin member 2 held in the member holding mechanism 8 composed of the unwinding rolls 23a and 23a' and the conveying rolls 23c, the electrode units 7, 7' and the power sources for generating ionized gas 11 and 11' are arranged and each of the surface treatment conditions is changed, whereby the degree of activity of the surface 3' to be joined of the first resin member 1 and the surface 3' to be joined of the second resin member 2 can be individually controlled. Optimizing each of the degrees of activation of the surfaces 3 and 3' to be joined allows the joining strength to be further improved.

[First Embodiment of Method for Producing Joined-Resin Product]

Figure 11:
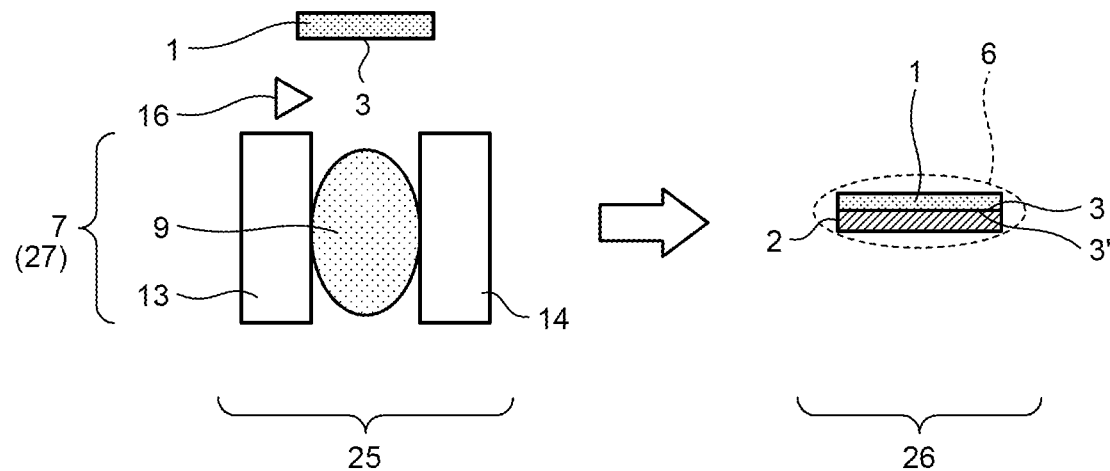
FIG. 11 is a schematic view illustrating an example of a method for producing the joined-resin product according to the present invention.

Subsequently, the method for producing the joined-resin product will be described. FIG. 11 is a schematic view illustrating the first embodiment of the method for producing the joined-resin product according to the present invention. As illustrated in FIG. 11, the first embodiment of the method for producing the joined-resin product includes a surface treatment step 25 and a joining step 26.

[Surface Treatment Step]

The surface treatment step 25 will be described. At the surface treatment step 25, any gas for generating ionized gas is supplied from the gas supply nozzle 16 and thereafter the ionized gas 9 is generated by the ionized gas generating mechanism 27. The active species in the generated ionized gas 9 collides against the surface 3 to be joined of the first resin member 1 and/or the surface 3' to be joined of the second resin member 2 arranged at a position separated by a space from a place where the ionized gas 9 is generated to activate the surfaces 3 and 3' to be joined.

As described above, the active species and neutrons in the ionized gas 9 generated by the ionized gas generation mechanism 27 diffuse outside the space where the ionized gas 9 is generated. The active species in the neutron and active species serving as the diffusion gas adheres to the surface 3 to be joined of the first resin member 1 separately arranged from the ionized gas 9 by the space, whereby the surface 3 to be joined chemically reacts to activate the surface 3 to be joined. This allows the charged particle collisions and heat load to the surface 3 to be joined to be reduced and thus deterioration in optical properties and decrease in mechanical strength of the first resin member 1 to be reduced. The same is applied in the case where the surface 3' to be joined of the second resin member 2 is activated.

The species of the gas for generating ionized gas is not particularly limited. Examples of the gas species include noble gas such as argon and helium and non-polymerizable gas such as oxygen, water vapor, and nitrogen. Two or more different gas species may be mixed.

Although not particularly limited, the ionized gas generating mechanism 27 may be a means that can ionize the gas serving as the raw material for ionized gas 9 by applying energy such as an electric field, heat, and light. The electrode unit 7 can locally generate the ionized gas 9 by an electric field applied to the space between the cathode 14 and anode 13 and thus is preferable.

The space where the ionized gas 9 is generated refers to a region where energy such as electric field, heat, and light is imparted by the ionized gas generating mechanism 27. For example, in the case of the electrode unit 7, the space refers to a space between the cathode 14 and the anode 13.

At the surface treatment step 25, only either of the surface 3 to be joined of the first resin member 1 and the surface 3' to be joined of the second resin member 2 may be subjected to the surface treatment or both may be subjected to the surface treatment. Performing the surface treatment to both of the surfaces 3 and 3' to be joined is preferable because the joining force of the joined-resin product 6 after the subsequent joining step is stronger.

[Joining Step]

The joining step 26 will be described. At the joining step 26, one or both of the surface 3 to be joined of the first resin member 1 and the surface 3' to be joined of the second resin member 2 activated by the surface treatment step 25 are faced and bonded together. Bonding the resin members together allows the molecular diffusion and the covalent bond formation at the interface between the surface 3 to be joined of the first resin member 1 and the surface 3' to be joined of the second resin member 2 to proceed and thus the joining force between the surface 3 to be joined of the first resin member 1 and the surface 3' to be joined of the second resin member 2 is developed, whereby the joined-resin product 6 having strong joining force can be produced.

The first resin member 1 and the second resin member 2 are preferably pressurized with a heat press machine 12 or the like so that voids are not formed at the joining interface due to a wavy state or the like of the surface 3 to be joined of the first resin member 1 and the surface 3' to be joined of the second resin member 2. This allows the actual contact area of the first resin member 1 and the second resin member 2 to increase and thus the joining force of the joined-resin product 6 to be improved.

As the temperatures of the first resin member 1 and the second resin member 2 at the joining step 26 become higher, the molecular diffusion and covalent bond formation at the joining interface of the joined-resin product 6 are promoted more. On the other hand, the temperatures of the first resin member 1 and the second resin member 2 exceeding Tg of the resin constituting the respective resin members cause the molecular structure and the like of the resin constituting the respective resin members to be changed (thermal alteration) and thus the mechanical properties, optical properties, and the like of the first resin member 1 and the second resin member 2 may deteriorate. Therefore, the temperatures of the entire first resin member 1 and the entire second resin member 2 at the joining step 26 are preferably set to temperatures lower than the glass transition temperature (Tg). This allows the joined-resin product 6 having excellent quality to be produced without changing the molecular structure or other properties of the resin constituting the first resin member 1 and the second resin member 2. The temperatures of the first resin member 1 and the second resin member 2 at the joining step 26 may be different.

Although not particularly limited, infrared heaters, microwave heaters, ultrasonic heaters, hot air generators, furnaces, and the like can be used as a means to heat the first resin member 1 and second resin member 2 at the joining step 26.

The joined-resin product 6 may also be post-heated after the joined-resin product 6 is produced at the joining step 26. This allows the molecular diffusion at the joining interface to be promoted and the joining force of the joined-resin product 6 to be further improved. Although not particularly limited, infrared heaters, microwave heaters, ultrasonic heaters, hot air generators, furnaces, and the like can be used as the post-heating means. From the viewpoint of preventing thermal alteration, the temperature of the post-heating is preferably lower than the glass transition temperatures (Tg) of the first resin member 1 and the second resin member 2.

At the joining step 26, three or more resin members may be overlapped and bonded together. In the case where three or more resin members are overlapped, only one of the facing surfaces to be joined may be subjected to the surface treatment in the above surface treatment step 25 or both of the facing surfaces to be joined may be subjected to the surface treatment.

[Second Embodiment of Method for Producing Joined-Resin Product]

Figure 12:
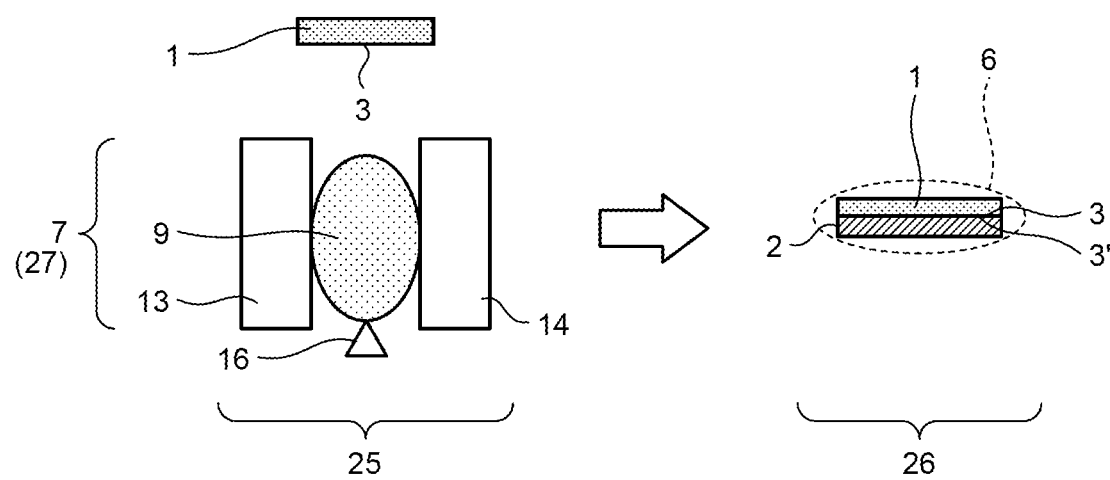
FIG. 12 is a schematic view illustrating another example of the method for producing the joined-resin product according to the present invention.

FIG. 12 is a schematic view illustrating the second embodiment of the method for producing the joined-resin product according to the present invention. In this production method according to the second embodiment, a gas is blown toward the surface 3 to be joined of the first resin member 1 so that the gas passes through the ionized gas 9 from the opposite side of the first resin member 1 interposing the space where the ionized gas 9 is generated. As described above, passing the gas through the space between the anode 13 and the cathode 14 allows the efficiency of gas decomposition caused by the ionized gas 9 to increase. This allows the active species required for activating the surface 3 to be joined to be generated in a large amount and thus high-speed processing to be possible. Blowing the gas toward the surface 3 to be joined of the first resin member 1 allows the active species in the ionized gas 9 to be efficiently transported to the surface 3 to be joined of the first resin member 1 by the gas flow and the surface 3 to be joined to be activated at high speed.

EXAMPLE

Hereinafter, the method and apparatus for producing the joined-resin product 6 according to the present invention will be described with reference to Examples. The invention, however, is not limited to these Examples.

Example 1

A joined-resin product 6 was produced by performing each step as batch treatment using the production apparatus 107 of the joined-resin product illustrated in FIG. 7. As both of the first resin member 1 and second resin member 2, a polymethyl methacrylate (PMMA) film (Technolloy® S000, glass transition temperature 100° C.) having a thickness of 100 μm was used (Hereafter, the first resin member 1 is referred to as PMMA 1 and the second resin member is referred to as PMMA 2). As a result of measuring the surface roughness (arithmetic mean roughness Ra) of PMMA 1 and PMMA 2 with a laser microscope (Olympus Corporation: OLS 4100), both of the surface roughnesses were 12 nm.

The electrode unit 7 of the surface treatment mechanism 4 will be described. SUS 304 metal plates were used for the cathode 14 and anode 13 of the electrode unit 7 and the cathode 14 and the anode 13 were arranged so that surfaces were parallel to each other.

From the gas supply nozzle 16 (type A) arranged between the electrode unit 7 and the member holding mechanism 8, 100 sccm of nitrogen gas was supplied and the pressure inside the chamber 20 was controlled to 5 Pa with an exhaust pump 21.

A high-frequency power source 11 of 13.56 MHz was used for the power source for generating ionized gas 11 connected to the electrode unit 7. The output of the high-frequency power source 11 was adjusted to 100 W and high-frequency voltage was applied to generate the ionized gas 9 and the surface 3 to be joined of PMMA 1 was treated for 10 seconds to activate. The surface 3' to be joined of PMMA 2 was also treated under the same conditions.

Subsequently, the joining mechanism 5 will be described. The surface 3 to be joined of PMMA 1 and the surface 3' to be joined of PMMA 2 were bonded together for 10 minutes to prepare a joined-resin product 6 using a heat press machine 12 for the joining mechanism 5. At this time, the respective substrate temperatures of PMMA 1 and PMMA 2 were controlled to 91° C. and pressing pressure was applied at 2 MPa. The substrate temperatures were determined with a radiation thermometer (SATOTECH DT-8855).

The joining force of the joined-resin product 6 prepared as described above was evaluated by a 90-degree peel test using a peel tester (NIDEC-SHIMPO CORPORATION: FGS-50E). At this time, the peeling speed was set to 5 cm/min. As a result, the joining force of the joined-resin product 6 was 0.7 N/cm.

The yellowness index YI values of PMMA 1 and PMMA 2 after the surface treatment were evaluated using a spectral colorimeter (NIPPON DENSHOKU INDUSTRIES Co., Ltd.: SE 2000). As a result, both PMMA 1 and PMMA 2 had a yellowness index YI value of 0.46. The yellowness index YI values of PMMA 1 and PMMA 2 without surface treatment were both 0.45 and thus the degrees of yellowing of PMMA 1 and PMMA 2 prepared as described above were both 2.2%. In this Example, the term "degree of yellowing" refers to a change ratio in the yellowness index of the resin member before and after the surface treatment and is a value calculated from (Yellowness index of resin member after surface treatment−Yellowness index of resin member before surface treatment)/Yellowness index of resin member before surface treatment×100. The difference in the degree of yellowing before and after the surface treatment was 0.01, which is within the measurement error range, and the resin member is considered not to be damaged by the surface treatment.

Example 2

A joined-resin product 6 of PMMA 1 and PMMA 2 was prepared using the same joining conditions as the conditions in Example 1 except that the gas supplied from the gas supply nozzle 16 passed between the cathode 14 and the anode 13 and that the first resin member 1 and the second resin member 2 held by the member holding mechanism 8 were arranged so that the gas collided against the resin members (Type B).

The joining force of the joined-resin product 6 prepared as described above was 1.6 N/cm. Both of the yellowness index YI values of PMMA 1 and PMMA 2 after the surface treatment were 0.46 and both of the degrees of yellowing were 2.2%.

The joining force of the joined-resin product 6 increased by approximately 2.2 times as compared to the joining force in Example 1. It is conceivable that the joining force is increased because the gas supplied from the gas supply nozzle 16 of the surface treatment mechanism 4 passed between the cathode 14 and the anode 13 and PMMA 1 and PMMA 2 held by the member holding mechanism 8 were arranged so that the gas collided against PMMA 1 and PMMA 2, resulting in increasing the amount of the active species supplied to the surfaces 3 and 3' to be joined of PMMA 1 and PMMA 2 and thus improving the degree of activity. The difference in yellowness indices before and after the surface treatment was the same.

Example 3

A joined-resin product 6 of PMMA 1 and PMMA 2 was prepared using the same joining apparatus and joining conditions as those in Example 2 except that magnets 18 for magnetron magnetic field generation were provided in the cathode 14.

The joining force of the joined-resin product 6 prepared as described above was 3.0 N/cm or higher and breakage occurred during peeling. Both of the yellowness index YI values of PMMA 1 and PMMA 2 after the surface treatment were 0.46 and both of the degrees of yellowing were 2.2%.

The joining force of the joined-resin product 6 increased by 1.8 times or more as compared to the joining force of Example 2. It is conceivable that this is because the magnets 18 for magnetron magnetic field generation were provided in the cathode 14 of the surface treatment mechanism 4 and thus the ionized gas 9 was localized by the magnetron magnetic field generated between the cathode 14 and anode 13 of the surface treatment mechanism 4 to form the denser ionized gas 9. It is conceivable that this allows gas decomposition to be promoted and the amount of the active species supplied to the surfaces 3 and 3' to be joined of PMMA 1 and PMMA 2 to increase, resulting in further improving the degree of activity. The difference in yellowness indices before and after the surface treatment was the same.

Example 4

A joined-resin product 6 of PMMA 1 and PMMA 2 was prepared using the same joining apparatus and joining conditions as those in Example 3 except that only PMMA 2 was subjected to the surface treatment and PMMA 1 was not subjected to the surface treatment at the surface treatment step in the surface treatment mechanism 4.

The joining force of the joined-resin product 6 prepared as described above was 3.0 N/cm or higher and breakage occurred during peeling. The yellowness index YI value of PMMA 2 after the surface treatment was 0.46 and the degree of yellowing was 2.2%.

Compared to Example 3, no difference was observed in the joining force of the joined-resin product 6 and even when only the surface 3' to be joined of PMMA 2 was subjected to the surface treatment, the joining force was strong enough to break during peeling. It is conceivable that activation of only either of the surface 3 to be joined or the surface 3' to be joined by the surface treatment as described above results in promoting the molecular diffusion and the covalent bond formation at the joining interface of the surfaces to be joined and thus the joining force is developed.

However, the reason why no difference was observed in the joining force of the joined-resin products 6 between this Example and Example 3 is because both of the joined-resin products 6 were bonded so strongly that the joined-resin products 6 broke during peeling. It is assumed that if the joined-resin products 6 had not been broken during the peeling, the joined-resin product 6 of Example 3 in which both of the surface 3 to be joined of PMMA 1 and the surface 3' to be joined of PMMA 2 were subjected to the surface treatment would have had higher joining force.

Example 5

At the joining step with the joining mechanism 5, a joined-resin product 6 of PMMA 1 and PMMA 2 was prepared using the same joining apparatus and joining conditions as those in Example 3 except that the member temperatures of PMMA 1 and PMMA 2 were controlled to 135° C., which is a temperature equal to or higher than the glass transition temperature (100° C.), and that the heated PMMA 1 and PMMA 2 were pressurized.

The joining force of the joined-resin product 6 prepared as described above was 3.0 N/cm or higher and breakage occurred during peeling. Both of the yellowness index YI values of PMMA 1 and PMMA 2 after the surface treatment were 0.46 and both of the degrees of yellowing were 2.2%.

As compared to Example 3, difference was not observed in the joining forces of the joined-resin products 6. This is because, similarly to Example 3, the joining force of the joined-resin product 6 prepared in this Example was increase enough to cause breakage during peeling and the difference was not capable of being confirmed. The difference in yellowness indices before and after the surface treatment was the same.

Although the yellowness index of the joined-resin product 6 was 0.89 in Example 3, however, the yellowness was 1.21 in this Example. It is conceivable that this is because the member temperatures of PMMA 1 and PMMA 2 at the joining step were changed from 91° C. to 135° C. and the temperatures of the PMMA 1 and PMMA 2 became higher than the glass transition temperature, resulting in causing thermal alteration.

Example 6

A polyethylene terephthalate (PET) film (Lumirror® T60, glass transition temperature 70° C.) having a thickness of 100 μm was used as the first resin member 1 and second resin member 2 (hereafter, the first resin member 1 is referred to as PET 1 and the second resin member is referred to as PET 2). The temperatures of PET 1 and PET 2 were controlled to 65° C. in the joining mechanism 5. A joined-resin product 6 of PET 1 and PET 2 was prepared under the same joining apparatus and joining conditions as those in Example 3 except those changes.

The joining force of the joined-resin product 6 of PET 1 and PET 2 joined by the above joining apparatus was 0.6 N/cm. Both of the yellowness index YI values of PET 1 and PET 2 before surface treatment were 2.01. The yellowness index YI values of PET 1 and PET 2 after surface treatment were both 2.02 and both of the degrees of yellowing were 0.5%.

The joining force of the joined-resin product 6 was lowered by 0.2 times as compared to the joining force of Example 3. It is conceivable that this is because as the first resin member 1 and the second resin member 2, PMMAs 1 and 2, which are amorphous material were replaced with PETs 1 and 2, which are crystalline materials, and thus thermal mobility of the molecular chains becomes lower and the molecular diffusion at the surfaces 3 and 3' to be joined of the resin members becomes smaller.

Comparative Example 1

A joined-resin product 6 of PMMA 1 and PMMA 2 was prepared using the same joining apparatus and joining conditions as those in Example 1 except that PMMA 1 and PMMA 2 were arranged in the space between the anode 13 and the cathode 14 in the electrode unit 7.

The joining force of the joined-resin product 6 prepared as described above was 3.0 N/cm or higher and breakage occurred during peeling. Both of the yellowness index YI values of PMMA 1 and PMMA 2 after the surface treatment were 0.57 and both of the degrees of yellowing were 26.7%.

The joining force of the joined-resin product 6 increased by 4.2 times or more as compared to the joining force of Example 1. It is conceivable that this is because PMMA 1 and PMMA 2 were arranged in the space where the ionized gas 9 was generated between the anode 13 and the cathode 14, whereby the active species and charged particles supplied to the surfaces 3 and 3' to be joined caused more collisions and thus the degree of activity increased. On the other hand, the difference in yellowness indices before and after surface treatment became larger by 1.2 times. It is conceivable that the modified layers at the surfaces 3 and 3' to be joined became deeper and alteration caused by heat was generated by applying the charged particle collisions and the heat load to the surfaces 3 and 3' to be joined of PMMA 1 and PMMA 2.

Comparative Example 2

A joined-resin product 6 of PMMA 1 and PMMA 2 was prepared using the same joining apparatus and joining conditions as those in Example 1 except that no surface treatment was performed on both PMMA 1 and PMMA 2.

The joining force of the joined-resin product 6 prepared as described above was 0.0 N/cm. In this Example, both of the yellowness index YI values of PMMA 1 and PMMA 2 were 0.45 and both of the degrees of yellowing were 0.0% because no surface treatment was performed.

The joining conditions for each of Examples and Comparative Examples are listed in Table 1 and the results are listed in Table 2.

In Table 2, with respect to the joining force, a value of 3.0 N/cm or more is represented as "⊚", 1.0 N/cm or more and less than 3.0 N/cm as "○", 0.5 N/cm or more and less than 1.0 N/cm as "Δ", and less than 0.5 N/cm as "×". With respect to the ratio of degree of yellowing, a value of 0.0% or more and less than 5.0% is represented as "⊚" and a values of 5.0% or more is represented as "×".

TABLE 1

| First member 1 and second resin member 2 resin | Surface treatment step of first resin member | | | | |
|---|---|---|---|---|---|
| | Kind of atmospheric gas | Position of gas supply nozzle | Magnetron magnetic Field | Position of member | High-frequency power source output [W] |
| Example 1 PMMA1 PMMA2 | Nitrogen | A | Absence | Outside electrodes | 100 |
| Example 2 PMMA1 PMMA2 | Nitrogen | B | Absence | Outside electrodes | 100 |
| Example 3 PMMA1 PMMA2 | Nitrogen | B | Presence | Outside electrodes | 100 |
| Example 4 PMMA1 PMMA2 | | | Absence | | |
| Example 5 PMMA1 PMMA2 | Nitrogen | B | Presence | Outside electrodes | 100 |
| Example 6 PET1 PET2 | Nitrogen | B | Presence | Outside electrodes | 100 |
| Comparative Example 1 PMMA1 PMMA2 | Nitrogen | A | Absence | Between electrodes | 100 |
| Comparative Example 2 PMMA1 PMMA2 | | | Absence | | |

| | Surface treatment step of second resin member | | | | | Joining step | | |
|---|---|---|---|---|---|---|---|---|
| | Kind of atmospheric gas | Position of gas supply nozzle | Magnetron magnetic Field | Position of member | High-frequency power source output [W] | Joining temperature [° C.] | Joining pressure [MPa] | Joining time [min] |
| Example 1 | Nitrogen | A | Absence | Outside electrodes | 100 | 91 | 2 | 10 |
| Example 2 | Nitrogen | B | Absence | Outside electrodes | 100 | 91 | 2 | 10 |
| Example 3 | Nitrogen | B | Presence | Outside electrodes | 100 | 91 | 2 | 10 |
| Example 4 | Nitrogen | B | Presence | Outside electrodes | 100 | 91 | 2 | 10 |
| Example 5 | Nitrogen | B | Presence | Outside electrodes | 100 | 135 | 2 | 10 |
| Example 6 | Nitrogen | B | Presence | Outside electrodes | 100 | 65 | 2 | 10 |
| Comparative Example 1 | Nitrogen | A | Absence | Between electrodes | 100 | 91 | 2 | 10 |
| Comparative Example 2 | Absence | | | | | 91 | 2 | 10 |

TABLE 2

| No | First resin member 1 Second resin member 2 | Joining force [N/cm] | Yellowness index YI [-] | Difference in yellowness index YI to non-treated product [-] | Ratio of degree of yellowing [%] |
|---|---|---|---|---|---|
| Example 1 | PMMA1 PMMA2 | 0.7(△) | 0.46 | 0.01 | 2.2(◎) |
| Example 2 | PMMA1 PMMA2 | 1.6(○) | 0.46 | 0.01 | 2.2(◎) |
| Example 3 | PMMA1 PMMA2 | 3.0 or higher(◎) | 0.46 | 0.01 | 2.2(◎) |

TABLE 2-continued

| No | First resin member 1 Second resin member 2 | Joining force [N/cm] | Yellowness index YI [-] | Difference in yellowness index YI to non-treated product [-] | Ratio of degree of yellowing [%] |
|---|---|---|---|---|---|
| Example 4 | PMMA1 PMMA2 | 3.0 or higher(◎) | 0.46 | 0.01 | 2.2(◎) |
| Example 5 | PMMA1 PMMA2 | 3.0 or higher(◎) | 0.46 | 0.01 | 2.2(◎) |
| Example 6 | PET1 PET2 | 0.6(△) | 2.02 | 0.01 | 0.5(◎) |
| Comparative example 1 | PMMA1 PMMA2 | 3.0 or higher (◎) | 0.57 | 0.12 | 26.7(×) |
| Comparative example 2 | PMMA1 PMMA2 | 0.0 (X) | 0.45 | 0.0 | 0.0(◎) |

INDUSTRIAL APPLICABILITY

Use of the apparatus for producing and method for producing the joined-resin product according to the present invention allows adhesive-free joined-resin product having high joining force without altering optical properties and mechanical properties to be easily obtained. For example, the adhesive-free joined-resin product may be applied to optical films and microfluid devices. The application range, however, is not limited thereto.

REFERENCE SIGNS LIST

1 First resin member
2 Second resin member
3, 3' Surface to be joined
4 Surface treatment mechanism
5 Joining mechanism
6 Joined-resin product
7, 7' Electrode unit
8 Member holding mechanism
9, 9' Ionized gas
10, 10' Step monitoring means
11, 11' Power source for generating ionized gas
12 Heat press machine
13, 13' Anode
14, 14' Cathode
15 Press surface
16, 16' Gas supply nozzle
17 Rectification plate
18 Magnet
18a Central magnet
18b Peripheral magnets
19, 19' Metal mesh
20 Chamber
21 Vacuum pump
22 Vacuum gauge
23 Conveying mechanism
23a, 23a' Unwinding rolls
23b Winding roll
23c, 23d Conveying rolls
24 Conveying direction
25 Surface treatment step
26 Joining step
27 Ionized gas generation mechanism
28 Second gas supply nozzle
101 to 110 Apparatus for producing joined-resin product
h1 Length of anode in gas supply direction
h2 Length of cathode in gas supply direction
d1 Distance from anode to surface to be joined of resin member
d2 Distance from cathode to surface to be joined of resin member

The invention claimed is:

1. An apparatus for producing a joined-resin product in which two or more resin members are joined, the apparatus comprising:
a surface treatment mechanism comprising an electrode unit generating ionized gas, and a member holding mechanism arranged at a position separated from the electrode unit by a space and holding the resin member, the surface treatment mechanism activating a surface to be joined of the resin member held by the member holding mechanism, by the ionized gas generated by the electrode unit; and
a joining mechanism bonding the two or more resin members together where at least one of surfaces to be joined facing each other is activated by the surface treatment mechanism, at the respective surfaces to be joined,
wherein the surface treatment mechanism is equipped with a rectification plate surrounding a space between the member holding mechanism and the electrode unit.

2. The apparatus for producing the joined-resin product according to claim 1, wherein
the electrode unit is a facing anode and cathode,
the member holding mechanism is configured to hold the resin member so that a space generating the ionized gas between the anode and the cathode and the surface to be joined of the resin member separately face each other by a space, and
the electrode unit comprises a gas supply nozzle supplying gas for generating ionized gas toward the resin member held by the member holding mechanism through the space between the anode and the cathode.

3. The apparatus for producing the joined-resin product according to claim 2, wherein the cathode comprises magnets inside the cathode, the magnets forming a magnetron magnet field in the space between the anode and the cathode.

4. The apparatus for producing the joined-resin product according to claim 2, wherein a grounded metal mesh is provided between the space between the anode and the cathode and the resin member held by the member holding mechanism.

5. The apparatus for producing the joined-resin product according to claim 1, wherein:

the electrode unit is a facing anode and cathode, and
the rectification plate is electrically insulated from the anode and the cathode.

\* \* \* \* \*